(12) United States Patent
Miyazaki (10) Patent No.: US 10,177,935 B2
(45) Date of Patent: Jan. 8, 2019

(54) DATA TRANSFER SYSTEM, DATA TRANSFER SERVER, DATA TRANSFER METHOD, AND PROGRAM RECORDING MEDIUM

(71) Applicant: NEC Corporation, Tokyo (JP)

(72) Inventor: Tomoaki Miyazaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 65 days.

(21) Appl. No.: 15/316,311

(22) PCT Filed: Jun. 5, 2015

(86) PCT No.: PCT/JP2015/002836
§ 371 (c)(1),
(2) Date: Dec. 6, 2016

(87) PCT Pub. No.: WO2015/186366
PCT Pub. Date: Dec. 10, 2015

(65) Prior Publication Data
US 2018/0109401 A1 Apr. 19, 2018

(30) Foreign Application Priority Data
Jun. 6, 2014 (JP) .............................. 2014-117976

(51) Int. Cl.
*H04L 12/46* (2006.01)
*G06F 9/455* (2018.01)

(52) U.S. Cl.
CPC .......... *H04L 12/4641* (2013.01); *H04L 12/46* (2013.01); *H04L 12/4633* (2013.01); *G06F 2009/45595* (2013.01); *H04L 2212/00* (2013.01)

(58) Field of Classification Search
CPC ............. H04L 12/4641; H04L 12/4633; H04L 2212/00; G06F 2009/45595
See application file for complete search history.

(56) References Cited

U.S. PATENT DOCUMENTS

| | | | | |
|---|---|---|---|---|
| 6,836,481 | B1 * | 12/2004 | Hotta | H04L 12/1836 370/392 |
| 2002/0046348 | A1 * | 4/2002 | Brustoloni | H04L 29/12367 726/6 |

(Continued)

FOREIGN PATENT DOCUMENTS

| | | |
|---|---|---|
| JP | 2001-230774 | 8/2001 |
| JP | 2009-212739 | 9/2009 |

(Continued)

OTHER PUBLICATIONS

Communication dated Dec. 20, 2017 from the European Patent Office in counterpart application No. 15802330.9.

(Continued)

*Primary Examiner* — Kashif Siddiqui
(74) *Attorney, Agent, or Firm* — Sughrue Mion, PLLC (57) ABSTRACT

Disclosed is a data transfer system capable of efficiently transferring broadcast and multicast packets when a virtual network is configured in a network arranged over multiple domains. The data transfer system is equipped with: a first data transfer server for tunnel end points which belong to a first domain; and a second data transfer server for tunnel end points which belong to a second domain. The first data transfer server, upon receiving a packet from a tunnel end point in the first domain, transfers the packet to the second data transfer server and to the tunnel end points in the first domain other than the packet transfer source tunnel end point, and the second data transfer server, upon receiving the (Continued)

packet from the first data transfer server, transfers the packet to the tunnel end points in the second domain.

9 Claims, 11 Drawing Sheets (56) References Cited

U.S. PATENT DOCUMENTS

| | | | |
|---|---|---|---|
| 2003/0093691 A1* | 5/2003 | Simon | H04L 63/0428 726/4 |
| 2004/0044778 A1 | 3/2004 | Alkhatib et al. | |
| 2004/0225895 A1 | 11/2004 | Mukherjee et al. | |
| 2005/0265398 A1 | 12/2005 | Chapman et al. | |
| 2014/0307619 A1* | 10/2014 | Dolby | H04W 76/22 370/316 |

FOREIGN PATENT DOCUMENTS

| | | |
|---|---|---|
| JP | 2009212739 A * | 9/2009 |
| JP | 2013-528340 | 7/2013 |
| WO | 02/078253 A2 | 10/2002 |

OTHER PUBLICATIONS

International Search Report, PCT/JP2015/002836, dated Aug. 18, 2015.

M. Mahalingam et al. (8 authors), "VXLAN: A Framework for Overlaying Virtualized Layer 2 Networks over Layer 3 Network", [online], [retrieved on May 19, 2014], the Internet <URL:http://tools.ietf.org/pdf/draft-mahalingam-dutt-dcops-vxlan-02.pdf>.

M. Sridharan et al. (10 authors), "NVGRE: Network Virtualization using Generic Routing Encapsulation", [online], [retrieved on May 19, 2014], the Internet URL: http://tools.ietf.org/pdf/draft-sridharan-virtualization-nvgre-01.pdf.

Nick McKeown et al. (8 authors), "OpenFlow: Enabling Innovation in Campus Networks", [online], [retrieved on May 19, 2014], the Internet <URL:http://www.openflow.org/documents/openflow-wp-latest.pdf>.

* cited by examiner

TRANSMISSION DESTINATION STORAGE UNIT 14

| VNI | IP ADDRESS | DESTINATION NAME |
|-----|-----------------|------------------|
| 1 | 192.168.10.501 | VTEP20-1 |
| 1 | 192.168.10.502 | VTEP20-2 |

TRANSMISSION DESTINATION STORAGE UNIT 14-1

| VNI | IP ADDRESS | RECEPTION ID | TRANSMISSION ID | DESTINATION NAME |
|---|---|---|---|---|
| 1 | 192.168.10.501 | - | - | VTEP20-1 |
| 1 | 192.168.10.502 | - | - | VTEP20-2 |
| 1 | 192.168.20.201 | 52222 | 51111 | BCMC TRANSFER SERVER 10-2 |

Fig. 7

TRANSMISSION DESTINATION STORAGE UNIT 14-2

| VNI | IP ADDRESS | RECEPTION ID | TRANSMISSION ID | DESTINATION NAME |
|---|---|---|---|---|
| 1 | 192.168.20.603 | — | — | VTEP20-3 |
| 1 | 192.168.20.604 | — | — | VTEP20-4 |
| 1 | 192.168.10.101 | 51111 | 52222 | BCMC TRANSFER SERVER 10-1 |

TRANSMISSION DESTINATION STORAGE UNIT 14

| VNI | IP ADDRESS | DESTINATION NAME |
|---|---|---|
| 1 | 192.168.10.501 | VTEP20-1 |
| 1 | 192.168.10.502 | VTEP20-2 |
| 1 | 192.168.20.603 | VTEP20-3 |
| 1 | 192.168.20.604 | VTEP20-4 |

Fig. 11

DATA TRANSFER SYSTEM, DATA TRANSFER SERVER, DATA TRANSFER METHOD, AND PROGRAM RECORDING MEDIUM

TECHNICAL FIELD

The present invention relates to a data transfer system, a data transfer server, a data transfer method, and a program. In particular, the present invention relates to a data communication system, a data transfer server, a data transfer method, and a program that transfer broadcast and multicast when communication is performed using a tunneling technique.

BACKGROUND ART

In recent years, use of a virtual computer environment has been increasing in a large scale data center. In the virtual computer environment, a software-defined network (SDN) that controls network equipment by software is constructed. In a virtual local area network (VLAN) constructed based on the SDN, in order to avoid a problem of insufficiency in section resource of network apparatuses or a problem of complexity in setting of network equipment, an overlay network technique for constructing an edge overlay is used.

As the edge overlay network technique, tunneling techniques such as a virtual extensible local area network (VXLAN) and a network virtualization using generic routing encapsulation (NVGRE) are known (NPLs 1 and 2). In these techniques, communication of a virtual network constructed in a virtual computer is encapsulated, and the communication is caused to flow in a basic network (Substrate Network or physical network) including network equipment configuring the virtual computer environment. In these tunneling techniques, section resource of the virtual network can be virtually increased by adding a virtual network ID (Identifier) upon encapsulating. Moreover, in these tunneling techniques, by using communication in the basic network, a load of setting for the network equipment is reduced.

However, these tunneling techniques do not define processing contents regarding a broadcast, a multicast, and an Unknown unicast in detail, but merely state the use of the IP (Internet Protocol) multicast technique of a basic network. An IP multicast address is sometimes shared, but is normally configured for each virtual network ID. Therefore, a multicast is delivered to the entire region of a network of the constructed virtual computer environment, i.e. the virtual network as an object (See "4.2. Broadcast Communication and Mapping to Multicast" of NPL 1 and "4.1. Broadcast and Multicast Traffic" of NPL 2).

Moreover, PTL 1 discloses a switch which is applied to a technique for encapsulating a packet by a header referred to as a TRILL (Transparent Interconnection of Lots of Links) header. The switch disclosed in PTL 1 is provided with a means for determining an internal multicast group identifier based on a source address, a multicast address, and a multicast tree identifier field, associated with a multicast packet. Moreover, this switch is provided with a means for transferring the multicast packet based on the internal multicast group identifier.

Furthermore, NPL 3 describes a network control technique referred to as OpenFlow. Using OpenFlow allows an OpenFlow switch to function as a TEP (Tunnel End Point) device of a tunneling technique.

CITATION LIST

Patent Literature

PTL 1: Japanese Patent Application Laid-open Publication (Translation of PCT Application) No. 2013-528340

Non-Patent Literature

NPL 1: M. Mahalingam et al. (8 authors), "VXLAN: A Framework for Overlaying Virtualized Layer 2 Networks over Layer 3 Network", [online], [retrieved on May 19, 2014], the Internet <URL:http://tools.ietf.org/pdf/draft-mahalingam-dutt-dcops-vxlan-02. pdf>

NPL 2: M. Sridharan et al. (10 authors), "NVGRE: Network Virtualization using Generic Routing Encapsulation", [online], [retrieved on May 19, 2014], the Internet URL: http://tools.ietf.org/pdf/draft-sridharan-virtualization-nvgre-01. pdf NPL 3: Nick McKeown et al. (8 authors), "OpenFlow: Enabling Innovation in Campus Networks", [online], [retrieved on May 19, 2014], the Internet <URL:http://www.openflow.org/documents/openflow-wp-latest.pdf>

SUMMARY OF INVENTION

Technical Problem

The entire disclosure contents of the above-described PTL and NPLs are assumed to be incorporated and described by reference. The following analyses are performed by the present inventors.

Although VXLAN (Virtual Extensible Local Area Network) has various advantages, necessity of a physical network corresponding to multicast may be a barrier against introduction. On the other hand, instead of using a multicast, a method in which an alternative device is caused to learn a destination to which a broadcast is sent, and then the alternative device copies and sends a packet to all destinations can be conceived. The method has an advantage that the above-described network associated with the multicast becomes unnecessary, and network construction becomes simple. However, according to the method, unlike the multicast, upon transfer from the alternative device to the destination, a packet is copied and transferred. Therefore, there is a problem that, when being transferred over domain, a network efficiency degrades because a copied packet goes through the same path.

Accordingly, in a network over a plurality of domains (groups or bases), when a virtual network is configured by using the VXLAN, a technique of efficiently transferring a broadcast packet to a plurality of destinations among bases without using a multicast, is desired.

Especially, when a virtual network is configured in the network over the plurality of domains, efficiently transferring the broadcast and the multicast is a problem. The present invention aims to provide a data transfer system, a data transfer server, a data transfer method, and a program that contribute to a solution for the problem.

Solution to Problem

A data transfer system according to the first aspect of the present invention includes:

a first data transfer server provided for tunnel end points belonging to a first domain; and a second data transfer server provided for tunnel end points belonging to a second domain, wherein the first data transfer server includes one or more processors acting as a first transfer unit configured to transfer, when receiving a packet from one of the tunnel end points belonging to the first domain, the packet to the second data transfer server and to the tunnel end points belonging to the first domain but excluding a transfer source of the packet, and the second data transfer server includes the one or more processors acting as a second transfer unit configured to transfer, when receiving the packet from the first data transfer server, the packet to the tunnel end points belonging to the second domain.

A first data transfer server according to the second aspect of the present invention, that is provided for tunnel end points belonging to a first domain, includes:

one or more processors acting as a first transfer unit configured to transfer, when receiving a packet from one of the tunnel end points belonging to the first domain, the packet to a second data transfer server provided for tunnel end points belonging to a second domain and to the tunnel end points belonging to the first domain but excluding a transfer source of the packet, wherein the second data transfer server is configured to transfer, when receiving the packet from the first data transfer server, the packet to the tunnel end points belonging to the second domain.

A data transfer method according to the third aspect of the present invention includes:

receiving, by a first data transfer server provided for tunnel end points belonging to a first domain, a packet from one of the tunnel end points belonging to the first domain;

transferring the packet to a second data transfer server provided for a tunnel end point belonging to a second domain and to the tunnel end points belonging to the first domain but excluding a transfer source of the packet; and transferring, by the second data transfer server, when receiving the packet from the first data transfer server, the packet to the tunnel end points belonging to the second domain.

A program recording medium according to the fourth aspect of the present invention, for recording a program that causes a computer provided in a first data transfer server provided for tunnel end points belonging to a first domain, to execute:

a process that receives a packet from one of the tunnel end points belonging to the first domain; and a process that transfers the packet to a second data transfer server provided for tunnel end points belonging to a second domain and to the tunnel end points belonging to the first domain but excluding a transfer source of the packet. In addition, the program may be provided as a program product recorded in a non-transitory computer-readable storage medium.

Advantageous Effects of Invention

The data transfer system, the data transfer server, the data transfer method, and program according to the present invention enables, when a virtual network is configured in a network over a plurality of domains, a broadcast and a multicast to be transferred efficiently.

EXAMPLE EMBODIMENT

First, an outline of an example embodiment will be described. The sole purpose of the reference signs in the drawings added to the outline is for examples in assisting understanding, and they are not intended for limiting the present invention to the aspects illustrated in figures.

Figure 1:
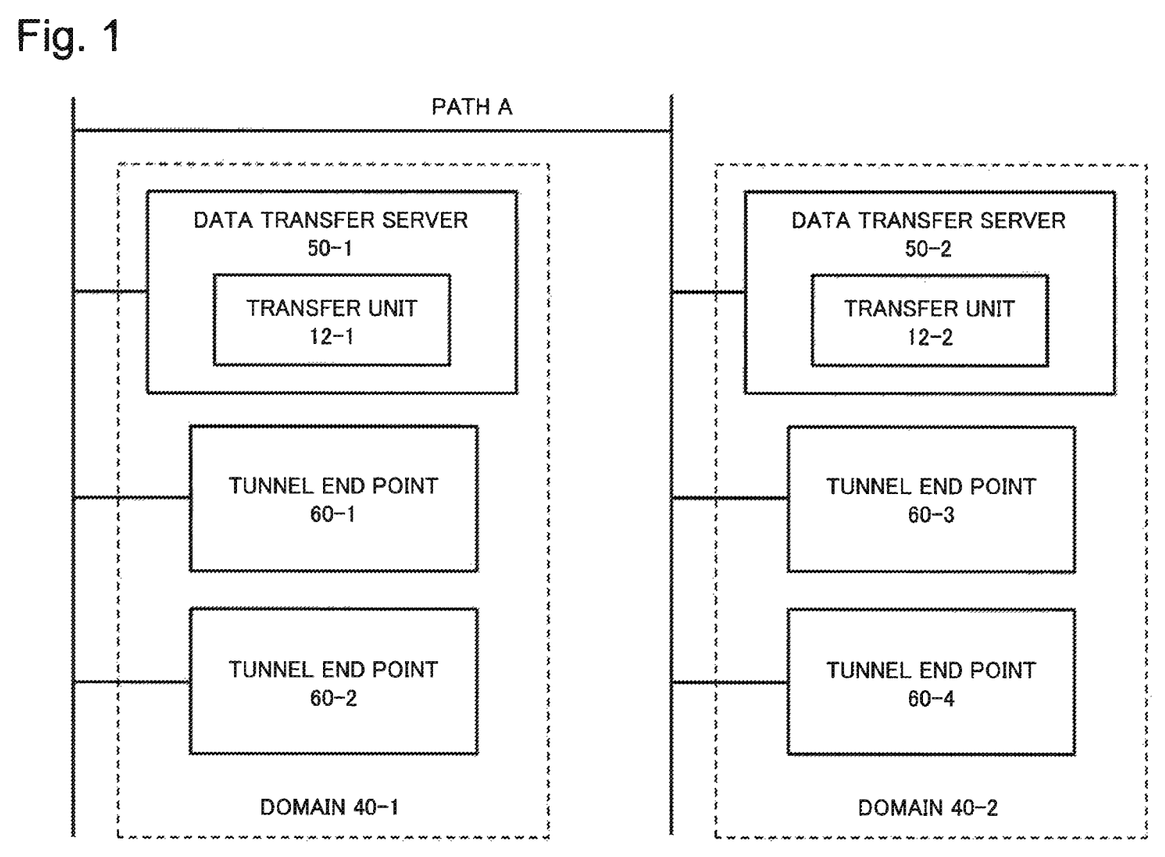
FIG. 1 is a block diagram exemplifying a configuration of a data transfer system according to an example embodiment.

FIG. 1 is a block diagram exemplifying a configuration of a data transfer system according to an example embodiment. Referring to FIG. 1, the data transfer system includes a first data transfer server 50-1 arranged for tunnel end points 60-1 and 60-2 belonging to a first domain 40-1. Moreover, the data transfer system includes a second data transfer server 50-2 arranged for tunnel end points belonging to a second domain 40-2. The first data transfer server 50-1 includes a first transfer unit 12-1. When receiving a packet from the tunnel end point 60-1 belonging to the first domain 40-1, the first transfer unit 12-1 transfers the packet to the following. Specifically, the first transfer unit 12-1 transfers the packet to the second data transfer server 50-2 and to the tunnel end point 60-2, other than the transfer source of the packet out of tunnel end points belonging to the first domain 40-1. On the other hand, the second data transfer server 50-2 includes a second transfer unit 12-2. When receiving a packet from the first data transfer server 50-1, the second transfer unit 12-2 transfers the packet to the tunnel end points 60-3 and 60-4 belonging to the second domain 40-2.

According to the data transfer system, a multicast or a broadcast sent from a virtual server accommodated in the tunnel end point 60-1 toward virtual servers accommodated in the tunnel end points 60-2 to 60-4 is transferred as follows. Specifically, the multicast or broadcast is transferred as a unicast from the tunnel end point 60-1 to the data transfer server 50-1 and from the data transfer server 50-1 to the tunnel end point 60-2. Alternatively, the multicast or broadcast is transferred as a unicast from the data transfer server 50-1 to the data transfer server 50-2 and from the data transfer server 50-2 to the tunnel end points 60-3 and 60-4. According to the data transfer system, the transfer as described above can reduce, compared with a case of directly transferring data from the data transfer server 50-1 to the tunnel end points 60-3 and 60-4, a traffic at a transmission path "A" connecting the domain 40-1 and the domain 40-2. In other words, the data transfer system according to the example embodiment enables, when a virtual network is configured in a network over a plurality of domains, a broadcast and a multicast to be transferred efficiently.

Herein, the first transfer unit 12-1 preferably changes a transmission source port number of a packet to a predetermined number, and transfers the number to the second data transfer server 50-2. The second transfer unit 12-2 preferably identifies a data transfer server as a transfer source of a packet, based on the transmission source port number of the packet. According to the data transfer system, a phenomenon that a packet reciprocates between the data transfer servers 50-1 and 50-2 can be prevented.

First Example Embodiment

Next, a data transfer system according to a first example embodiment will be described in detail with reference to the drawings.

Figure 2:
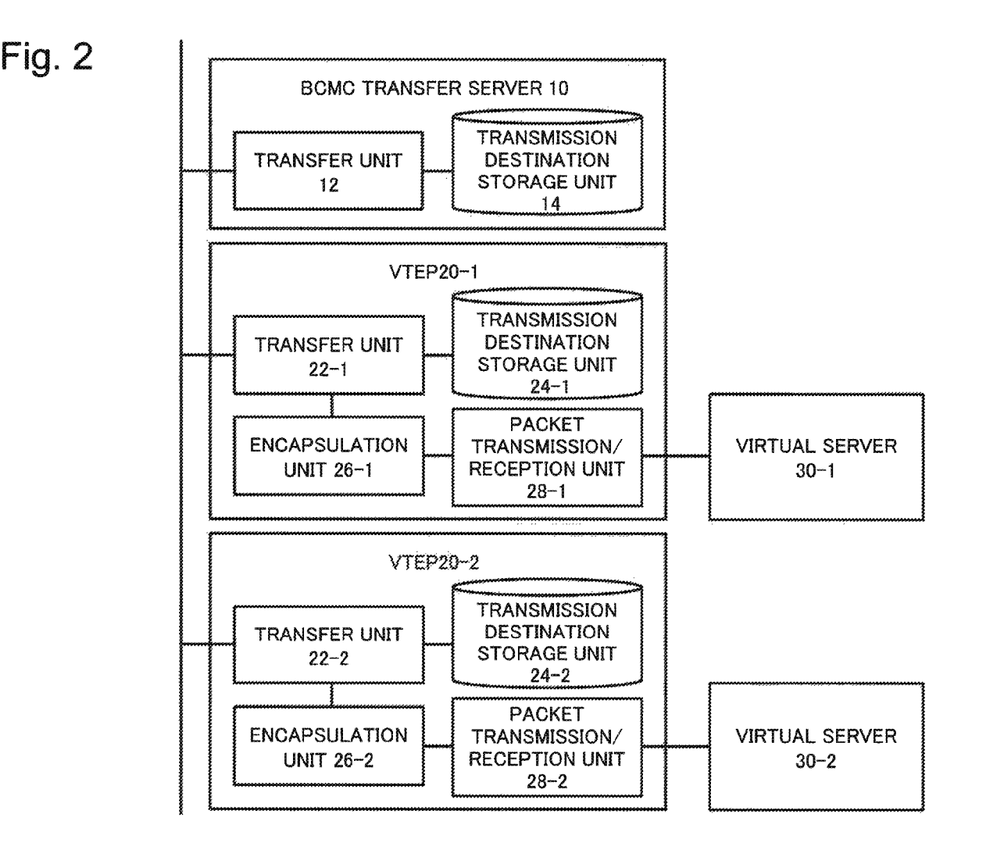
FIG. 2 is a block diagram exemplifying a configuration of a data transfer system according to a first example embodiment.

FIG. 2 is a block diagram exemplifying a configuration of a data transfer system according to the present example embodiment. Referring to FIG. 2, the data transfer system according to the present example embodiment includes a BCMC transfer server 10, VXLAN (Virtual Extensible Local Area Network) Tunnel End Points (VTEP) 20-1 and 20-2, and virtual servers 30-1 and 30-2. The BCMC transfer server 10 is a server that transfers a broadcast and a multicast (hereinafter, BCMC: Broadcast Multicast).

The BCMC transfer server 10 includes a transfer unit 12 and a transmission destination storage unit 14. On the other hand, the VTEP 20-1 includes a transfer unit 22-1, a transfer destination storage unit 24-1, an encapsulation unit 26-1, and a packet transmission/reception unit 28-1. The VTEP 20-2 includes a transfer unit 22-2, a transfer destination storage unit 24-2, an encapsulation unit 26-2, and a packet transmission/reception unit 28-2. The virtual servers 30-1 and 30-2 send and receive packets. The transfer unit 12 of the BCMC transfer server 10 and the transfer units 22-1 and 22-2 of the VTEPs 20-1 and 20-2 are connected via a network in which TCP (Transmission Control Protocol)/IP (Internet Protocol) communication can be performed, and include IP addresses with which communication can be performed with each other.

Figure 3:
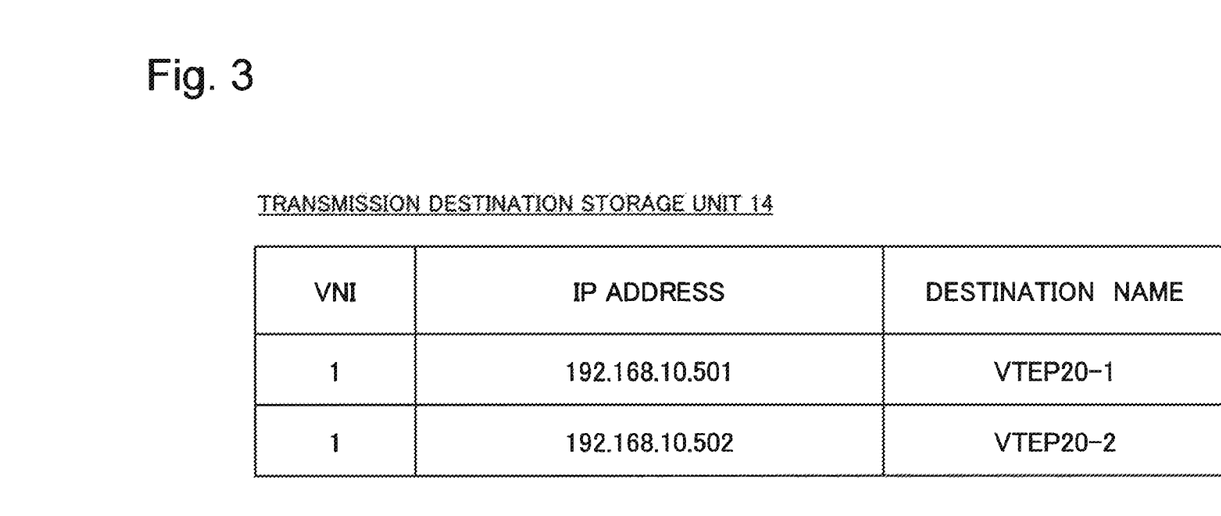
FIG. 3 is a diagram exemplifying a table retained by a transmission destination storage unit of a BCMC transfer server in the data transfer system according to the first example embodiment.

The VTEP 20-1 encapsulates a packet sent from the virtual server 30-1, and sends the packet to the BCMC transfer server 10. FIG. 3 exemplifies a table retained by the transmission destination storage unit 14 of the BCMC transfer server 10. The BCMC transfer server 10 sends a packet to the VTEP 20-2, excluding the VTEP 20-1 that is the transmission source, in accordance with the table in FIG. 3 retained by the transmission destination storage unit 14. When receiving the packet, the VTEP 20-2 releases the encapsulation, and transfers the packet to the virtual server 30-2.

Figure 4:
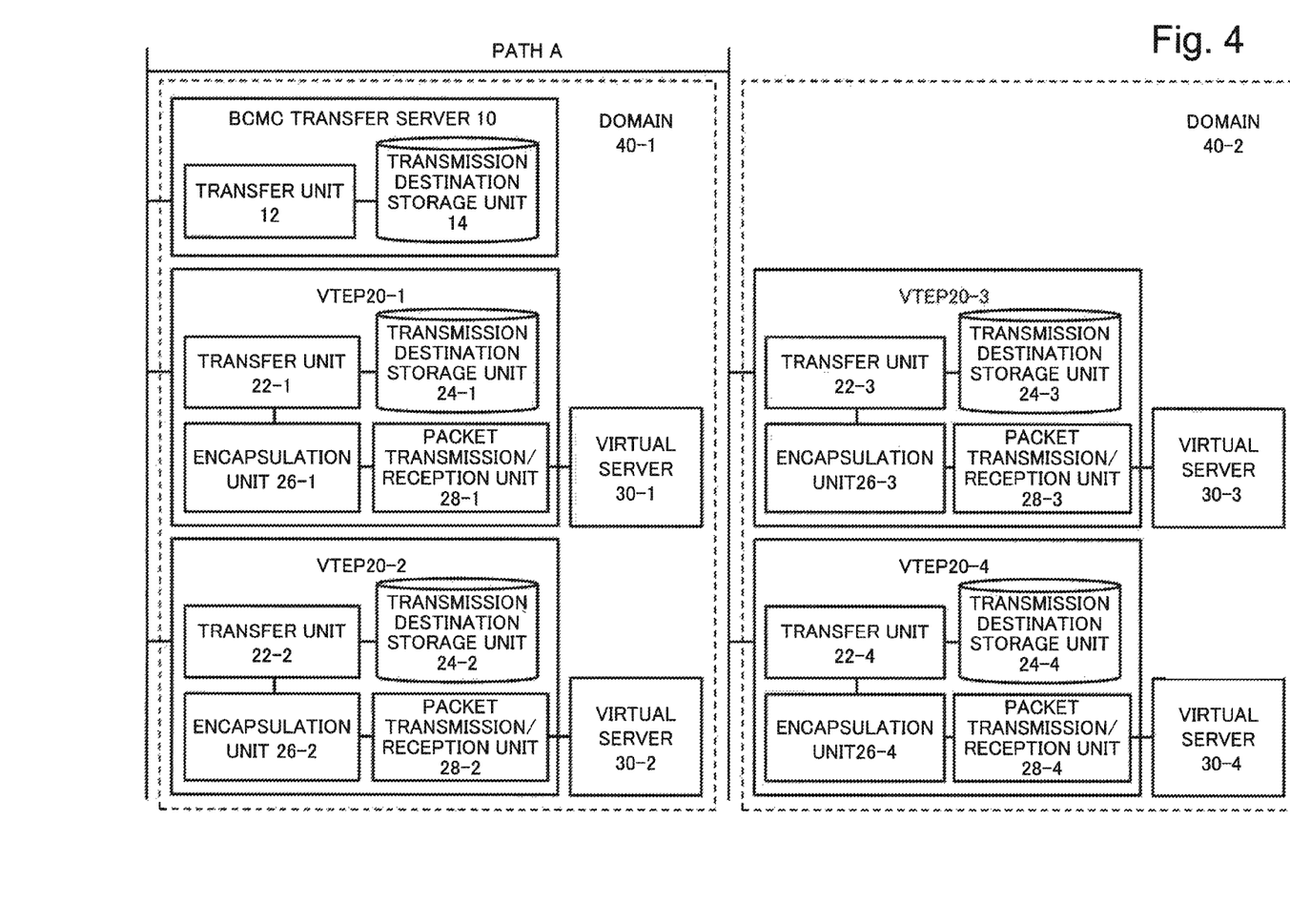
FIG. 4 is a block diagram exemplifying a configuration of a data transfer system according to a first comparative example.

Next, a case where a number of VTEPs is increased in the method illustrated in FIG. 2 will be considered. FIG. 4 is a block diagram exemplifying a configuration, as a first comparative example, in which the number of VTEPs is increased.

Herein, in the configuration illustrated in FIG. 4, all virtual servers 30-1 to 30-4 are assumed to be able to perform communication in the same VNI (VXLAN Network Identifier). At this time, when the virtual server 30-1 sends a broadcast packet, the packet goes through a transmission path "A". Herein, because the packet is copied in a BCMC transfer server 10, two packets directed to VTEPs 20-3 and 20-4 go through the transmission path "A". Moreover, when the transmission path "A" is cut, the VTEPs 20-3 and 20-4 cannot send broadcasts. In order to solve a problem that the transmission path "A" has influence on the entire network, in the present example embodiment, instead of the configuration in FIG. 4, a configuration in FIG. 5 to be described in detail in the following is employed.

Figure 5:
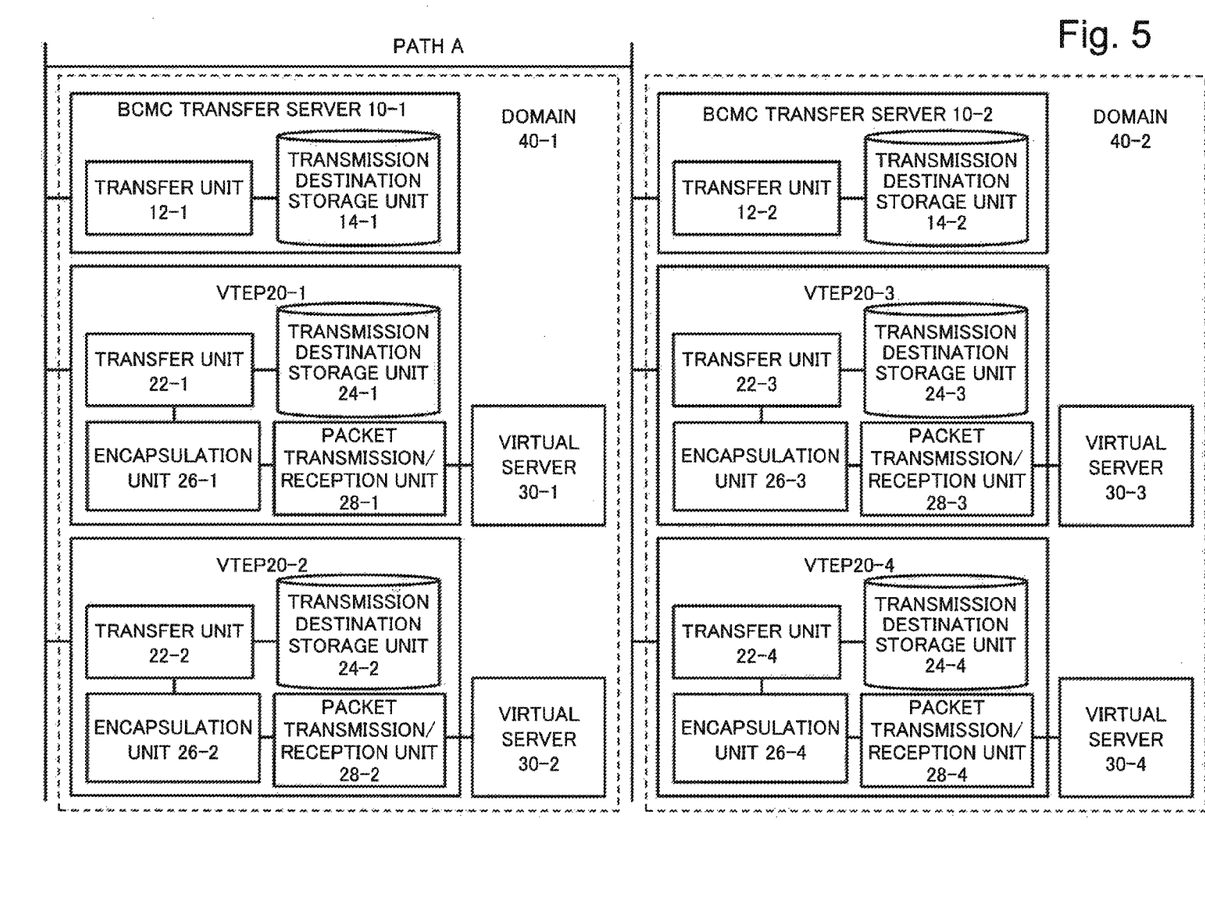
FIG. 5 is a block diagram exemplifying another configuration of the data transfer system according to the first example embodiment.

FIG. 5 is a block diagram exemplifying a configuration of a data transfer system according to the present example embodiment when a number of VTEPs is increased.

Figure 6:
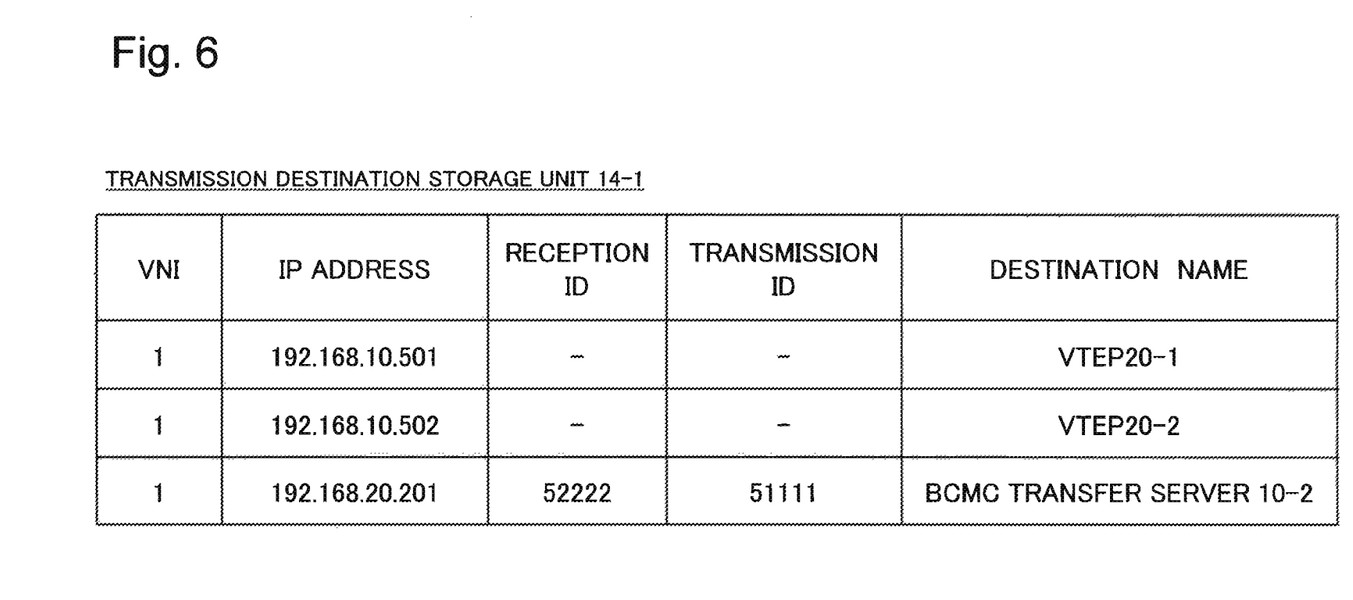
FIG. 6 is a diagram exemplifying an example of a table retained by a transmission destination storage unit 14-1 of a first BCMC transfer server 10-1 in the data transfer system according to the first example embodiment.

Referring to FIG. 5, in the data transfer system according to the present example embodiment, BCMC transfer servers are arranged for respective domains (or groups) of the VTEPs. In the case illustrated in FIG. 5, a BCMC transfer server 10-1 is connected to VTEPs 20-1 and 20-2, and a BCMC server 10-2 is connected to VTEPs 20-3 and 20-4. Moreover, fields of a transmission ID and a reception ID are added to tables retained in transmission destination storage units 14-1 and 14-2. FIG. 6 exemplifies a table retained by the transmission destination storage unit 14-1 of the BCMC transfer server 10-1. On the other hand, FIG. 7 exemplifies a table retained by the transmission destination storage unit 14-2 of the BCMC transfer server 10-2.

Figure 7:
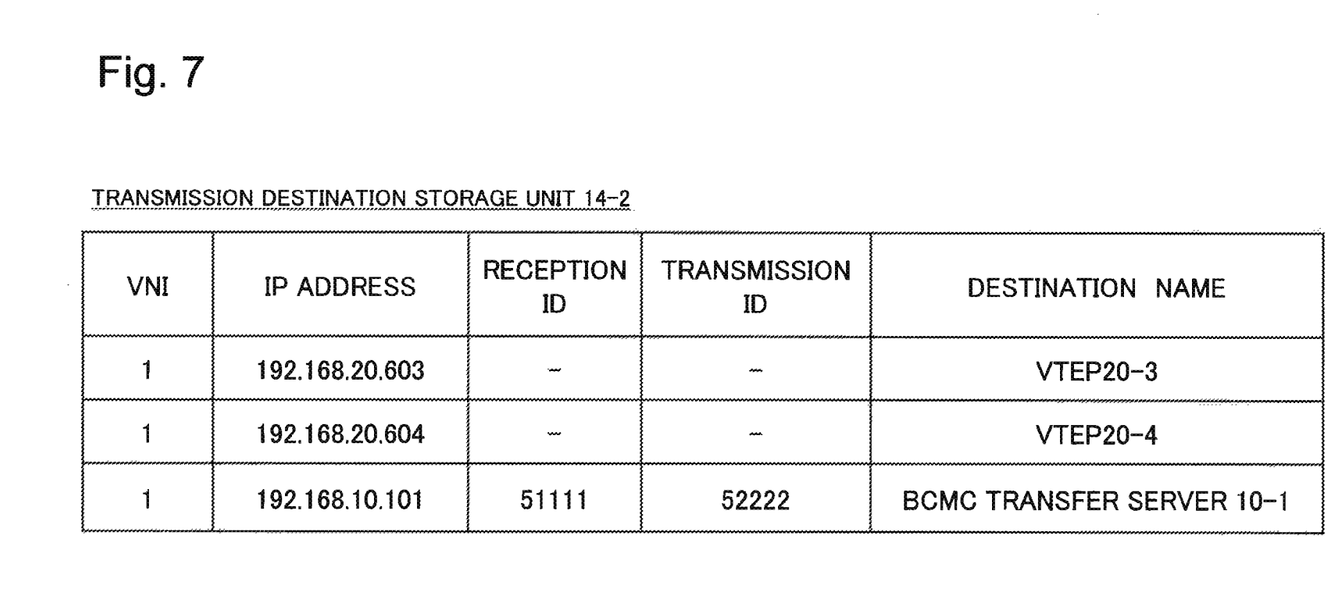
FIG. 7 is a diagram exemplifying a table retained by a transmission destination storage unit 14-2 of a second BCMC transfer server 10-2 in the data transfer system according to the first example embodiment.

A case is considered where the BCMC transfer server 10-1 and the BCMC transfer server 10-2 perform the same process, respectively, as in the case illustrated in FIG. 2 (process of not using a transmission ID and a reception ID) by using the tables in FIG. 6 and FIG. 7. First, the VTEP 20-1 encapsulates a packet sent from the virtual server 30-1, and sends the packet to the BCMC transfer server 10-1. Next, the BCMC transfer server 10-1, in accordance with the table in FIG. 6, sends the packet to the VTEP 20-2 and the BCMC transfer server 10-2, excluding the VTEP 20-1. Subsequently, the BCMC transfer server 10-2 performs processing in accordance with the table in FIG. 7. Herein, because the IP address of the transmission source is VTEP 20-1, the BCMC transfer server 10-2 determines that the BCMC transfer server 10-1 is not the transmission source, and also sends the copied packet to the BCMC transfer server 10-1. Then, the BCMC transfer server 10-1 that receives the packet further copies the packet and sends the packet to the BCMC transfer server 10-2.

In this way, transmission and reception may be repeated endlessly between the BCMC transfer server 10-1 and the BCMC transfer server 10-2. In order to avoid this, in the present example embodiment, a transmission ID and a reception ID are added to the tables retained by the transmission destination storage units 14-1 and 14-2, as illustrated in FIG. 6 and FIG. 7. Moreover, the BCMC transfer servers 10-1 and 10-2 additionally perform processing using the transmission ID and the reception ID. Contents of the processing additionally performed will be described in detail in the following description of operations.

Next, referring to the drawings, an operation of the data transfer system according to the present example embodiment (FIG. 2 or FIG. 5), and an operation of the first comparative example (FIG. 4) will be described.

Figure 8:
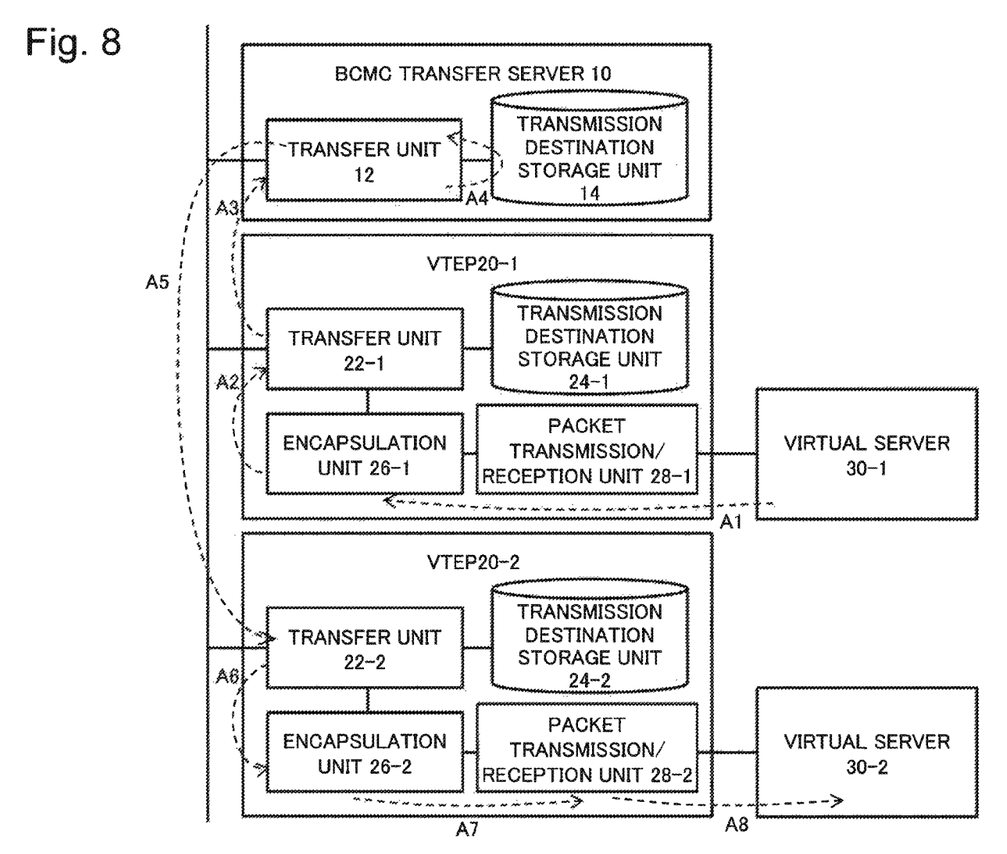
FIG. 8 is a block diagram exemplifying an operation of the data transfer system according to the first example embodiment.

FIG. 8 is a diagram for describing an operation of the data transfer system according to the present example embodiment (in the case of the configuration in FIG. 2). Referring to FIG. 8, a packet transmission/reception unit 28-1 of the VTEP 20-1 receives a message sent in broadcast from the virtual server 30-1 to the VTEP 20-1, and sends the message to the encapsulation unit 26-1 (step A1).

The encapsulation unit 26-1 of the VTEP 20-1 executes encapsulation of the VXLAN for the received message, and delivers the encapsulated packet to the transfer unit 22-1 (step A2).

The transfer unit 22-1 of the VTEP 20-1, unlike the standard VXLAN protocol, does not set a destination of the encapsulated packet to a multicast IP address for VXLAN, but to a unicast IP address of the BCMC transfer server 10. The transfer unit 22-1 sends the generated unicast packet to the BCMC transfer server 10 (step A3).

The transfer unit 12 of the BCMC transfer server 10 receives the packet and inquires of the transmission destination storage unit 14, with a VNI (VXLAN Network Identifier) of the received packet as a key, an IP address belonging to the VNI (step A4). FIG. 3 exemplifies a table retained by the transmission destination storage unit 14.

In order to send the packet to IP addresses of all external nodes acquired by the inquiry, the transfer unit 12 copies the packet, and sends a unicast packet individually (step A5). However, the transfer unit 12 does not send the packet to an IP address that is the same as the IP address of the transmission source. Moreover, the transfer unit 12 does not change the IP address of the transmission source when sending the packet.

At the VTEP 20-2 on the side to which a message is delivered, the transfer unit 22-2 receives the aforementioned unicast packet and sends the packet to the encapsulation unit 26-2 (step A6).

The encapsulation unit 26-2 of the VTEP 20-2 releases encapsulation for the received packet, and sends the packet to the packet transmission/reception unit 28-2 (step A7).

The packet transmission/reception unit 28-2 of the VTEP 20-2 sends the packet to the virtual server 30-2 (step A8).

Next, an operation in the first comparative example illustrated in FIG. 4 will be described. In FIG. 4, all virtual servers 30-1 to 30-4 are assumed to be able to perform communication in the same VNI. At this time, when the virtual server 30-1 sends a broadcast packet, the same processing as in the case of FIG. 2 is generated.

Figure 9:
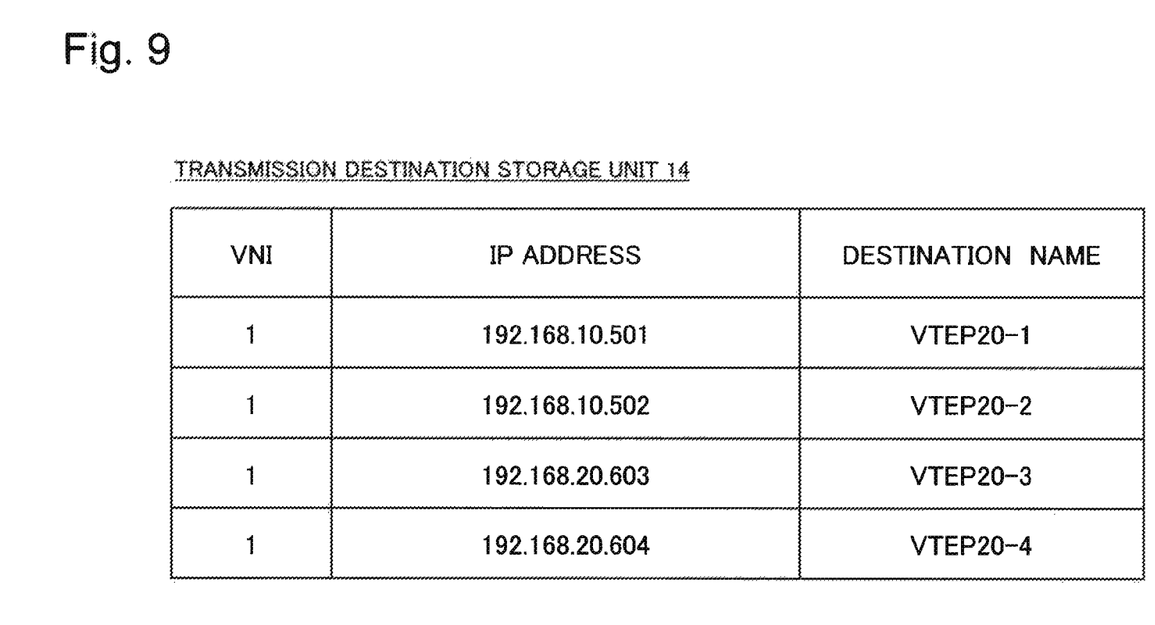
FIG. 9 is a diagram exemplifying a table retained by a transmission destination storage unit of a BCMC transfer server in the data transfer system according to the first comparative example.

FIG. 9 exemplifies a table retained by the transmission destination storage unit 14 of the BCMC transfer server 10 in the first comparative example illustrated in FIG. 4. Herein, when the processing at the aforementioned step A5 is performed, two packets directed to the VTEP 20-3 and the VTEP 20-4 go through the transmission path "A". Moreover, when the transmission path "A" is cut, the VTEP 20-3 and the VTEP 20-4 cannot send broadcasts. In order to solve such a problem, in the present example embodiment, when the VTEP extends over a plurality of domains (or groups), the configuration illustrated in FIG. 5 is employed.

Figure 10:
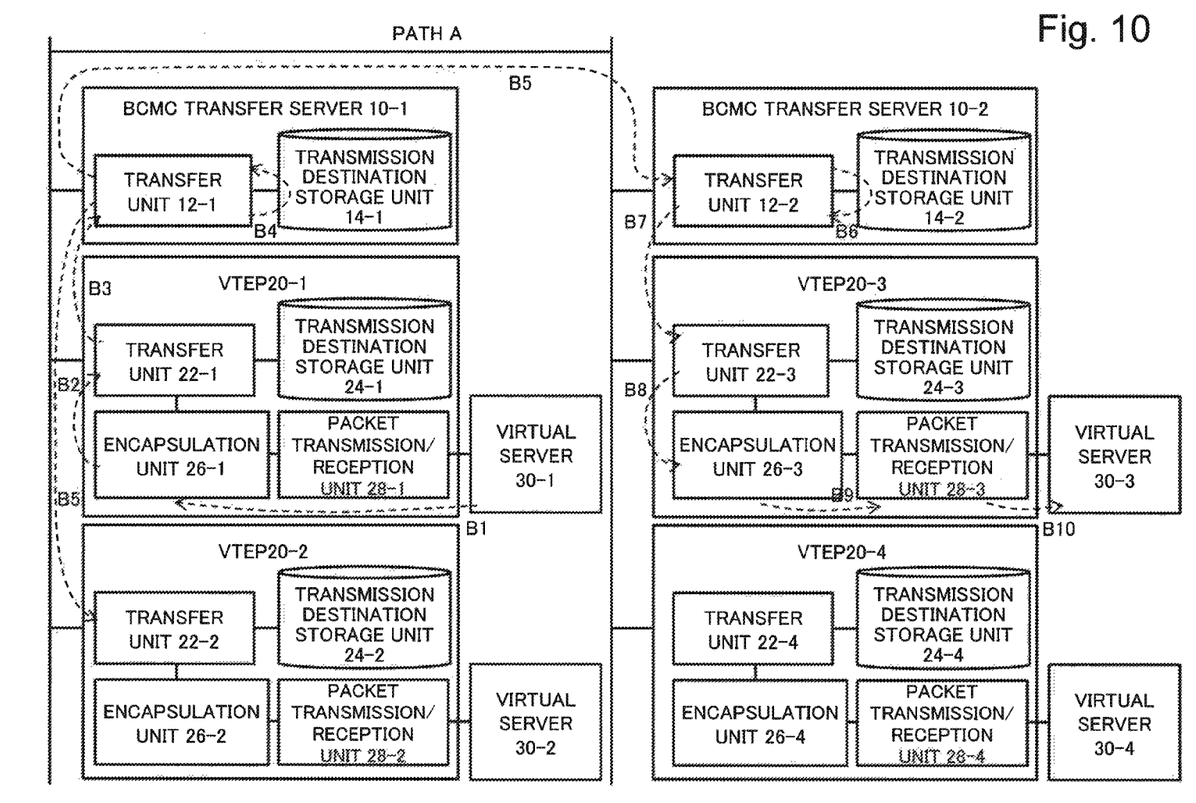
FIG. 10 is a block diagram exemplifying an operation of another configuration of the data transfer system according to the first example embodiment.

FIG. 10 is a diagram for describing an example of an operation in the data transfer system (in the case of the configuration illustrated in FIG. 5) according to the present example embodiment. Referring to FIG. 10, the packet transmission/reception unit 28-1 of the VTEP 20-1 receives a message sent in broadcast from the virtual server 30-1 to the VTEP 20-1, and sends the message to the encapsulation unit 26-1 (step B1).

The encapsulation unit 26-1 of the VTEP 20-1 performs encapsulation of VXLAN for the received message, and delivers the encapsulated packet to the transfer unit 22-1 (step B2).

The transfer unit 22-1 of the VTEP 20-1, unlike the standard VXLAN protocol, does not set a destination of the encapsulated packet to a multicast IP address for VXLAN, but to a unicast IP address of the BCMC transfer server 10-1. The transfer unit 22-1 sends the generated unicast packet to the BCMC transfer server 10-1 (step B3).

The transfer unit 12-1 of the BCMC transfer server 10-1 receives the packet and inquires of the transmission destination storage unit 14-1, with an VNI (VXLAN Network Identifier) of the received packet as a key, an IP address belonging to the VNI (step B4). FIG. 6 exemplifies a table retained by the transmission destination storage unit 14-1.

In order to send the packet to IP addresses of all external nodes acquired by the inquiry, the transfer unit 12-1 copies the packet, and sends a unicast packet individually (step B5). However, the transfer unit 12-1 does not send the packet to an IP address that is the same as the IP address of the transmission source or an IP address in a case that a port number of the transmission source coincides with a reception ID. Moreover, the transfer unit 12-1 does not change the IP address of the transmission source when sending the packet. Furthermore, when sending the packet to a destination which includes a value in the transmission ID, the transmission unit 12-1 sends the packet by changing the port number of the transmission source to the transmission ID.

Referring to FIG. 6, an IP address table of the BCMC transfer server 10-2 includes a transmission ID. Then, the transfer unit 12-1 changes a transmission source port number of a packet directed to the BCMC transfer server 10-2 to "51111" and sends the changed packet to the BCMC transfer server 10-2.

The transfer unit 12-2 of the BCMC transfer server 10-2 receives the packet from the BCMC transfer server 10-1, and inquires of the transmission destination storage unit 14-2, with an VNI (VXLAN Network Identifier) of the received packet as a key, an IP address belonging to the VNI (step B6). FIG. 7 exemplifies a table retained by the transmission destination storage unit 14-2.

In order to send the packet to IP addresses of all external nodes acquired by the inquiry, the transfer unit 12-2 copies the packet, and sends a unicast packet individually (step B7). However, the transfer unit 12-2 does not send the packet to an IP address that is the same as the IP address of the transmission source or an IP address in a case that a port number of the transmission source coincides with a reception ID. Moreover, the transfer unit 12-2 does not change the IP address of the transmission source when sending the packet. Furthermore, when sending the packet to a destination which includes a value in the transmission ID, the transmission unit 12-2 sends the packet by changing the port number of the transmission source to the value of the transmission ID (in this case "52222").

Referring to FIG. 7, because the transmission source port number of the packet is "51111", the transfer unit 12-2 does not transfer the packet to the BCMC transfer server 10-1.

At the VTEP 20-3 on the side to which a message is delivered, the transfer unit 22-3 receives the unicast packet, and sends the packet to the encapsulation unit 26-3 (step B8).

The encapsulation unit 26-3 of the VTEP 20-3 releases the encapsulation and sends the packet to the packet transmission/reception unit 28-3 (step B9).

The packet transmission/reception unit 28-3 of the VTEP 20-3 sends the packet to the virtual server 30-3 (step B10).

The data transfer system according to the present example embodiment provides an effect that a multicast becomes unnecessary in the VXLAN, and the number of packets going through the communication path "A" can be reduced from the first comparative example.

Moreover, the data transfer system according to the present example embodiment provides an effect that, during a failure of the communication path "A", broadcast transmission and reception can be continued at a domain (or group) for each BCMC transfer server.

Furthermore, according to the data transfer system of the present example embodiment, because it is not necessary to add a new parameter to a packet separately, there is no possibility of increasing a packet size compared with the method of the related art.

Moreover, according to the data transfer system of the present example embodiment, for cooperation with the BCMC transfer server, it is not necessary to add new processing of exchanging information based on packet communication to the BCMC server and the VTEP. Therefore, by providing a slight change to the related art, the data transfer system according to the present example embodiment may be provided.

Another Example Embodiment

In the first example embodiment, for simplicity, the case of two BCMC transfer servers is described. However, three or more BCMC transfer servers can be appended in the same way. Moreover, in the first example embodiment, the case of using VXLAN as a protocol is described, but the present invention is not limited thereto. In other words, the present invention can be applied to a method for transferring a broadcast and a multicast in a tunneling protocol configuring an overlay used for generating a virtual network.

Figure 11:
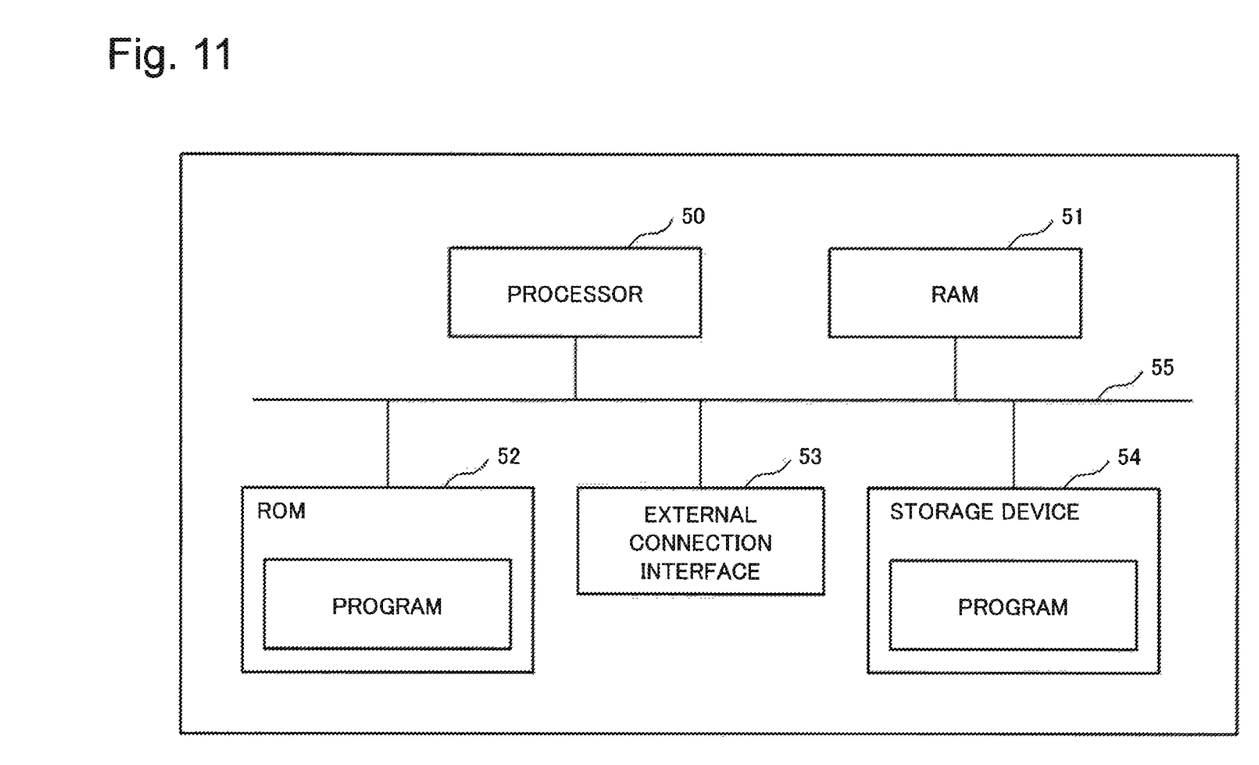
FIG. 11 is a diagram depicting an example of a hardware configuration enabling a device according to each example embodiment.

In addition, hardware resources exemplified in FIG. 11 provide the respective parts of the BCMC transfer server and the VTEP illustrated in FIG. 1 or the like. Specifically, the configuration illustrated in FIG. 11 includes a processor 50, a RAM (Random Access Memory) 51, a ROM (Read Only Memory) 52, an external connection interface 53, a storage device 54, and a bus 55 for connecting the respective components.

After providing a computer program that can achieve the aforementioned functions to the respective devices, functions indicated in the respective blocks in FIG. 1 or the like may be achieved by reading out and executing the computer program by the processor 50 onto the RAM 51. Alternatively, a part or whole of the functions indicated in the respective blocks in FIG. 1 or the like may be achieved as hardware.

The computer program provided as above may be stored in a computer-readable storage device, such as a readable and writable memory (temporary storage medium) and a hard disk. Then, in such a case, the present invention can be regarded as a configuration by a recording medium storing codes representing the computer program or storing the computer program.

Furthermore, in the present invention, the following embodiments are possible:

[Embodiment 1]

Embodiment 1 is the data transfer system according to the first aspect.

[Embodiment 2]

The data transfer system according to Embodiment 1, wherein the first transfer unit is configured to change a transmission source port number of the packet to a predetermined number, and transfer the predetermined number to the second data transfer server.

[Embodiment 3]

The data transfer system according to Embodiment 2, wherein the first data transfer server includes first storage unit for associating and retaining the second data transfer server with the predetermined number, and the first transfer unit is configured to change a transfer source port number of the packet to the predetermined number by referring to the first storage unit.

[Embodiment 4]

The data transfer system according to Embodiment 3, wherein the first storage unit is configured to associate and retain respective devices of the tunnel end point belonging to the first domain and the second data transfer server with IP (Internet Protocol) addresses of the respective devices.

[Embodiment 5]

The data transfer system according to any one of Embodiments 2 to 4, wherein the second transfer unit is configured to identify a data transfer server that is a transmission source of the packet, based on a transmission source port number of the packet.

[Embodiment 6]

The data transfer system according to Embodiment 5, wherein the second data transfer server includes second storage unit for associating and retaining the first data transfer server with the predetermined number, and the second transfer unit is configured to identify the data transfer server that is the transmission source of the packet, by referring to the second storage unit.

[Embodiment 7]

The data transfer system according to Embodiment 6, wherein the second storage unit is configured to associate and retain respective devices that is the tunnel end point belonging to the second domain and the first data transfer server with IP addresses of the respective devices.

[Embodiment 8]

Embodiment 8 is the data transfer server according to the second aspect.

[Embodiment 9]

The data transfer server according to Embodiment 8, wherein the first transfer unit is configured to change a transmission source port number of the packet to a predetermined number, and transfer the packet to the second data transfer server.

[Embodiment 10]

The data transfer server according to Embodiment 9, further including a first storage unit configured to associate and retain the second data transfer server with the predetermined number, wherein the first transfer unit is configured to, referring to the first storage unit, change a transmission source port number of the packet to the predetermined number.

[Embodiment 11]

The data transfer server according to Embodiment 10, wherein the first storage unit is configured to associate and retain respective devices that is the tunnel end point belonging to the first domain and the second data transfer server with IP (Internet Protocol) addresses of the respective devices.

[Embodiment 12]

Embodiment 12 is the data transfer method according to the third aspect.

[Embodiment 13]

The data transfer method according to Embodiment 12, further including a step of changing, by the first data transfer server, a transmission source port number of the packet to a predetermined number.

[Embodiment 14]

The data transfer method according to Embodiment 13, further including a step of identifying, by the second data transfer server, a data transfer server that is a transfer source of the packet, based on a transmission source port number of the packet.

[Embodiment 15]

Embodiment 15 is the program according to the fourth aspect.

[Embodiment 16]

The program according to Embodiment 15 that causes the computer to execute a process that changes a transmission source port number of the packet to a predetermined number.

Note that the contents of disclosure of the above-described PTL and NPLs are incorporated herein by reference in their entirety. Within the framework of the entire disclosure of the present invention (including claims), and furthermore based on the fundamental technological thought, the embodiment can be changed or adjusted. Moreover, within the framework of the entire disclosure of the present invention, various combinations or selections of a variety of disclosure elements (including respective elements of each embodiment, respective elements of each example embodiment, and respective elements in each figure) are possible. In other words, it is needless to say that the present invention includes various variation or modification that a person skilled in the art could make according to the entire disclosure including claims or the technological thought. Especially, regarding the range of number described in the present specification, arbitrary value or a small range included in the range of number should be interpreted as being specifically described even when it is not described otherwise.

This application is based upon and claims the benefit of priority from Japanese Patent Application No. 2014-117976 filed on Jun. 6, 2014, the entire disclosure of which is incorporated herein.

INDUSTRIAL APPLICABILITY

The present invention can be applied, for example, to a data transfer system in a network extending over a plurality of domains.

REFERENCE SIGNS LIST

10, 10-1, 10-2 BCMC transfer server
12, 12-1, 12-2 transfer unit
14, 14-1, 14-2 destination storage unit
20-1~20-4 VTEP
22-1~22-4 transfer unit
24-1~24-4 transfer destination storage unit
26-1~26-4 encapsulation unit
28-1~28-4 packet transmission/reception unit
30-1~30-4 virtual server
40-1, 40-2 domain
50-1, 50-2 data transfer server
60-1~60-4 tunnel end point
A transmission path

The invention claimed is:

1. A data transfer system comprising:
a first data transfer server provided for tunnel end points belonging to a first domain; and
a second date transfer server provided for tunnel end points belonging to a second domain, wherein
the first data transfer server includes one or more processors acting as a first transfer unit configured to transfer, when receiving a packet from one of the tunnel end points belonging to the first domain, the packet to the second data transfer server and to the tunnel end points belonging to the first domain but excluding a transfer source of the packet, and
the second data transfer server includes the one or more processors acting as a second transfer unit configured to transfer, when receiving the packet from the first data transfer server, the packet to the tunnel end points belonging to the second domain,
wherein
the first transfer unit is configured to change a transmission source port number of the packet to a predetermined number, and transfer the number to the second data transfer server, and
wherein
the first data transfer server includes a first storage unit configured to associate and retain the second data transfer server with the predetermined number, and
the first transfer unit is configured to change a transfer source port number of the packet to the predetermined number by referring to the first storage unit.

2. The data transfer system according to claim 1, wherein the first storage unit is configured to associate and retain respective devices of the tunnel end point belonging to the first domain and the second date transfer server with IP (Internet Protocol) addresses of the respective devices.

3. A data transfer system comprising:
a first data transfer server provided for tunnel end points belonging to a first domain; and
a second date transfer server provided for tunnel end points belonging to a second domain, wherein
the first data transfer server includes one or more processors acting as a first transfer unit configured to transfer, when receiving a packet from one of the tunnel end points belonging to the first domain, the packet to the second data transfer server and to the tunnel end points belonging to the first domain but excluding a transfer source of the packet, and
the second data transfer server includes the one or more processors acting as a second transfer unit configured to transfer, when receiving the packet from the first data transfer server, the packet to the tunnel end points belonging to the second domain,
wherein
the first transfer unit is configured to change a transmission source port number of the packet to a predetermined number, and transfer the number to the second data transfer server, and wherein the second transfer unit is configured to identify a data transfer server that is a transmission source of the packet, based on a transmission source port number of the packet.

4. The data transfer system according to claim 3, wherein the second data transfer server includes a second storage unit configured to associate and retain the first data transfer server with the predetermined number, and the second transfer unit is configured to identify a data transfer server that is a transfer source of the packet, by referring to the second storage unit.

5. The data transfer system according to claim 4, wherein the second storage unit is configured to associate and retain respective devices that is the tunnel end point belonging to the second domain and the first data transfer server with IP addresses of the respective devices.

6. The data transfer system according to claim 1, wherein the second transfer unit is configured to identify a data transfer server that is a transmission source of the packet, based on a transmission source port number of the packet.

7. The data transfer system according to claim 2, wherein the second transfer unit is configured to identify a data transfer server that is a transmission source of the packet, based on a transmission source port number of the packet.

8. A first data transfer server provided for tunnel end points belonging to a first domain, comprising:

one or more processors acting as a first transfer unit configured to transfer, when receiving a packet from one of the tunnel end points belonging to the first domain, the packet to a second data transfer server provided for tunnel end points belonging to a second domain and to the tunnel end points belonging to the first domain but excluding a transfer source of the packet, wherein the second data transfer server is configured to transfer, when receiving the packet from the first data transfer server, the packet to the tunnel end points belonging to the second domain, wherein The first transfer unit is configured to change a transmission source port number of the packet to a predetermined number, and transfer the number to the second data transfer server, and wherein the first data transfer server includes a first storage unit configured to associate and retain the second date transfer server with the predetermined number, and the first transfer unit is configured to change a transfer source port number of the packet to the predetermined number by referring to the first storage unit.

9. The first data transfer server according to claim 8, wherein the first storage unit is configured to associate and retain respective devices of the tunnel end point belonging to the first domain and the second date transfer server with IP (Internet Protocol) addresses of the respective devices.

* * * * *

UNITED STATES PATENT AND TRADEMARK OFFICE
CERTIFICATE OF CORRECTION

| | |
|---|---|
| PATENT NO. | : 10,177,935 B2 |
| APPLICATION NO. | : 15/316311 |
| DATED | : January 8, 2019 |
| INVENTOR(S) | : Tomoaki Miyazaki |

It is certified that error appears in the above-identified patent and that said Letters Patent is hereby corrected as shown below:

In the Claims

Column 12, Line 16; In Claim 1, delete "date" and insert --data-- therefor

Column 12, Line 45; In Claim 2, delete "date" and insert --data-- therefor

Column 12, Line 51; In Claim 3, delete "date" and insert --data-- therefor

Column 14, Line 14; In Claim 8, delete "The" and insert --the-- therefor

Column 14, Line 20; In Claim 8, delete "date" and insert --data-- therefor

Column 14, Line 29; In Claim 9, delete "date" and insert --data-- therefor

Signed and Sealed this
Fourth Day of June, 2019

Andrei Iancu
*Director of the United States Patent and Trademark Office*